3,488,122
PROCESS FOR DETERMINING THE SPECTRAL COMPOSITION OF LUMINOUS RADIATION DIFFUSED BY A COLORED SURFACE, AND APPARATUS FOR CARRYING OUT SAID PROCESS
Paul Roussopoulos, Paris, France, assignor to
Societe Anonyme dite: l'Oreal
Filed Jan. 25, 1965, Ser. No. 427,699
Int. Cl. G01j 3/42
U.S. Cl. 356—88                3 Claims

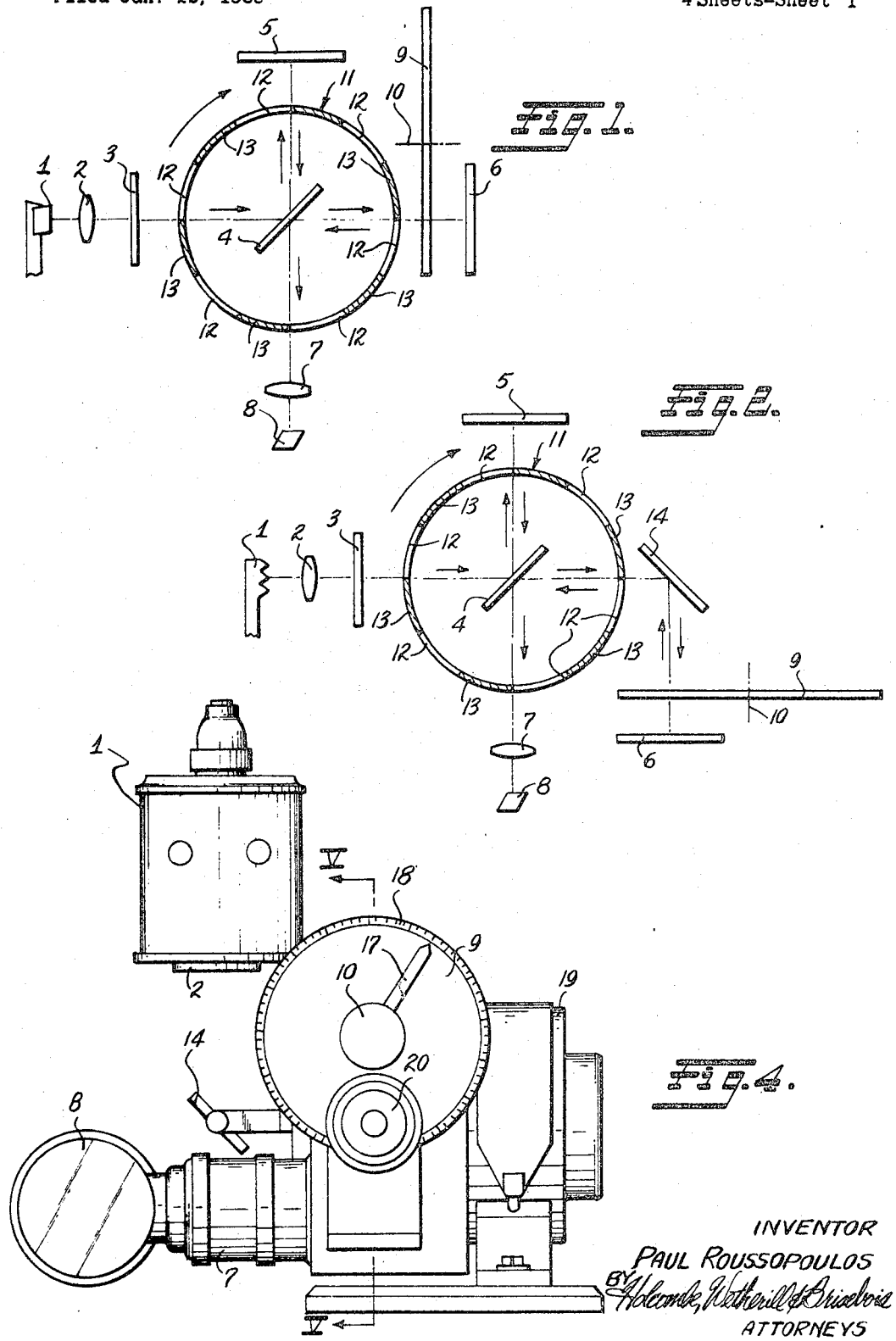

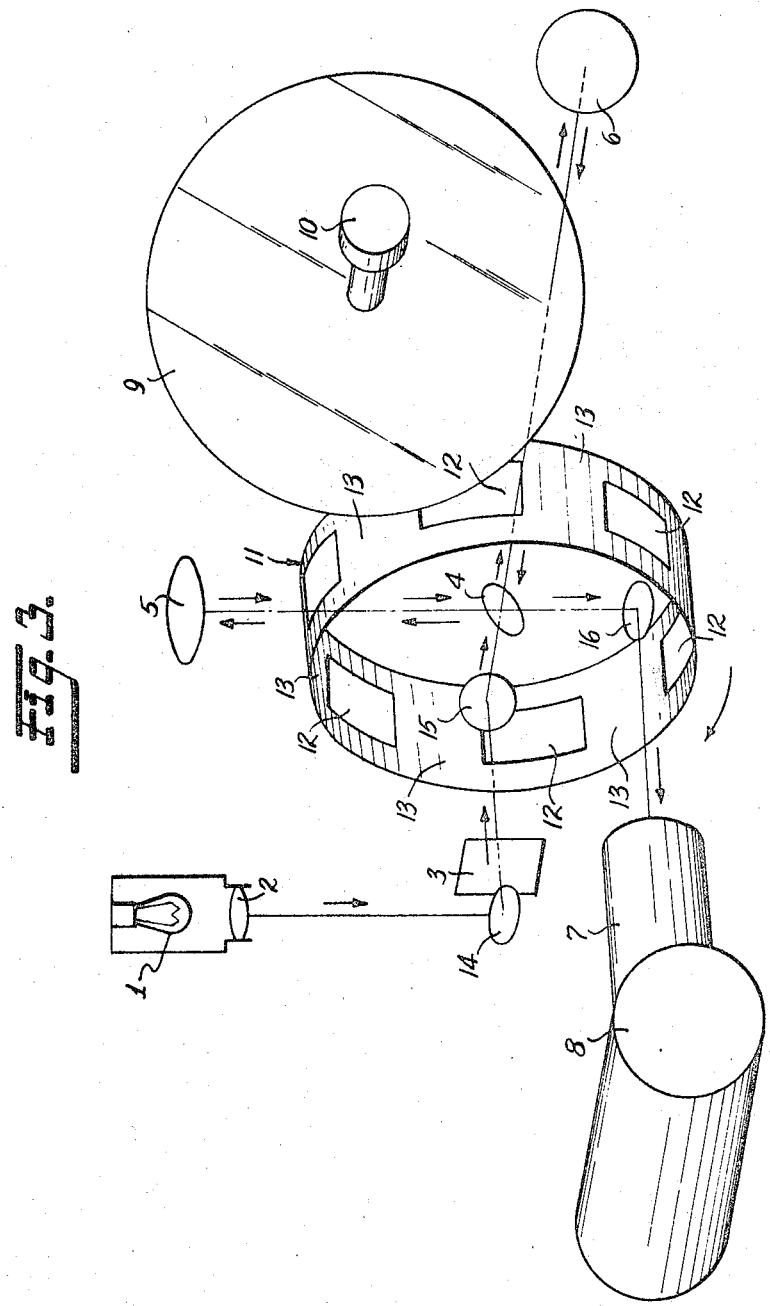

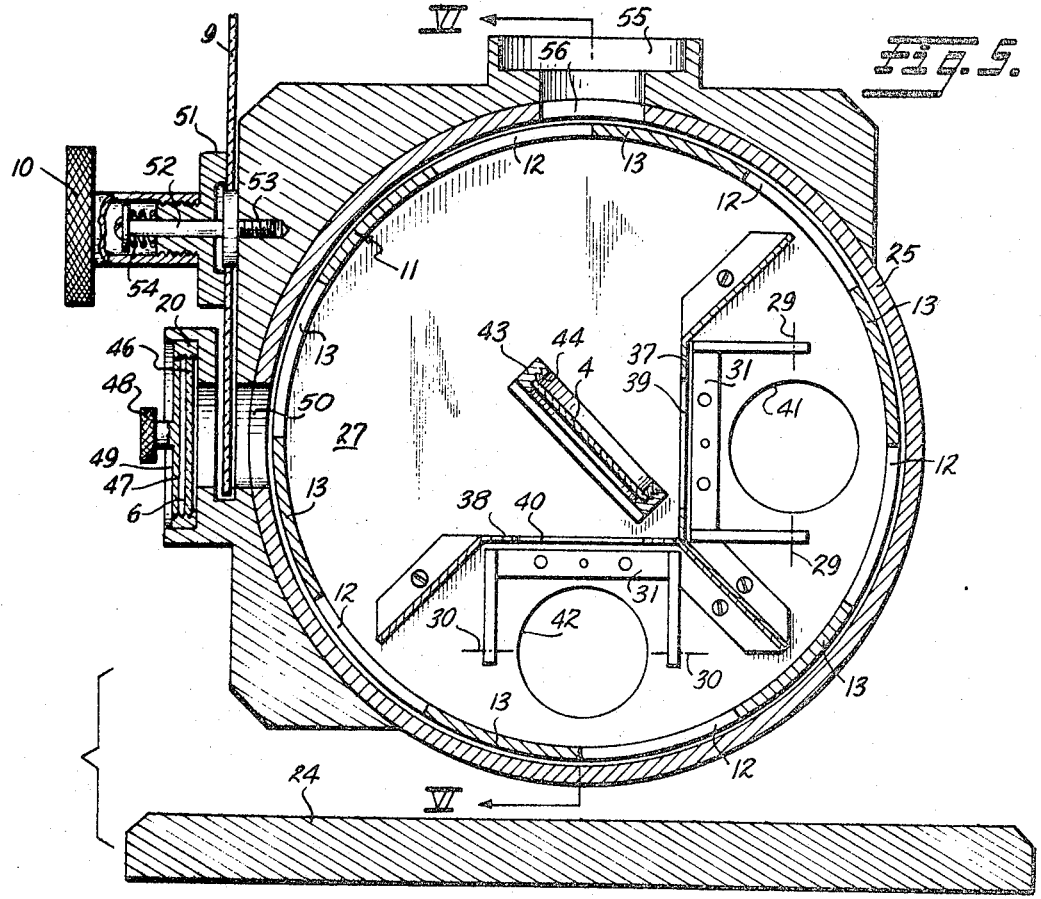
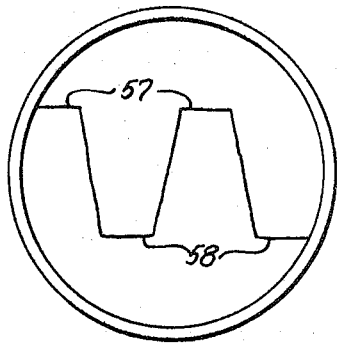
Fig. 7.
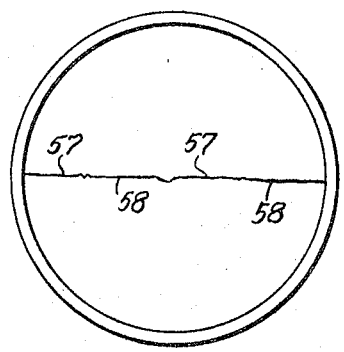
Fig. 8.
INVENTOR
PAUL ROUSSOPOULOS
BY Holcombe, Wetherill & Brisebois
ATTORNEYS

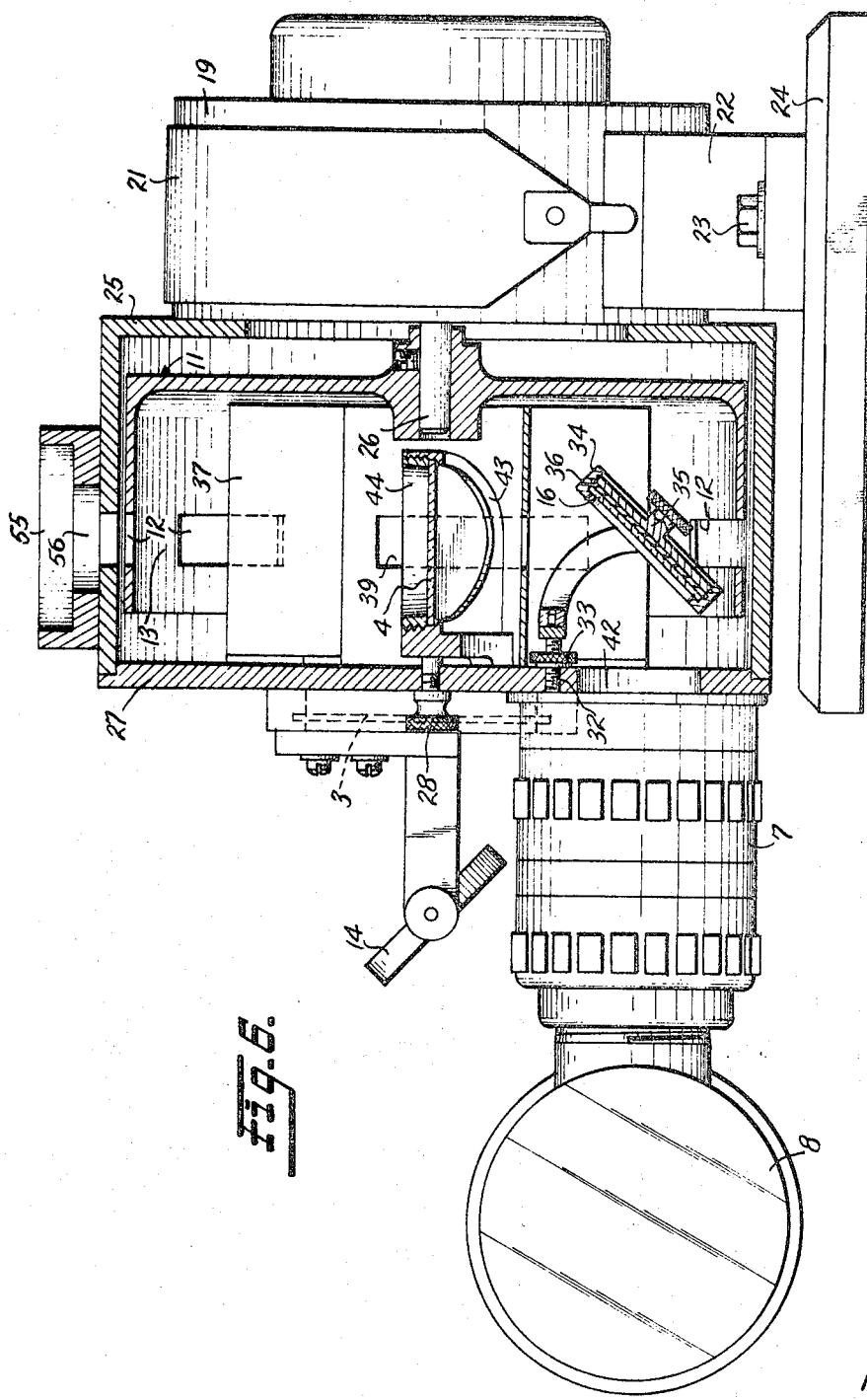

ABSTRACT OF THE DISCLOSURE

Method and apparatus for measuring the spectral composition of light reflected by an opaque surface by forming an incident beam of light, dividing said incident beam into a measuring beam and a reference beam, directing the reference beam onto a reference surface and the measuring beam on to a test surface for reflection therefrom, recombining the reference and measuring beams after they have been reflected, projecting the recombined beams against a photocell, feeding the output of the photocell to an oscilloscope, and attenuating said reference beam until the indications on the oscilloscope are substantially identical.

---

It is well known that the color of a substance, such as a paper, fabric, or powder, may be precisely identified by measuring the luminous radiation diffused by the substances in question when subjected to light waves of different lengths.

The process presently in general use consists in projecting a monochromatic light beam of a known color onto a surface the color of which is to be analyzed and measuring the intensity of the radiation diffused by that surface.

This process has several inherent disadvantages which have hitherto interfered with its application to a number of fields.

In the first place, it is necessary to perfectly stabilize the energy emitted by the light source, which almost always involves the use of electronic apparatus, which is particularly expensive and which is, in any event, incapable of correcting for all the modifying factors, and in particular for the age of the incandescent lamp which most commonly constitutes the light source.

Moreover, it is difficult to measure the absolute value of the radiation diffused by the surface to be analyzed when precision is desired, and this is even more true when dealing with dark surfaces which diffuse only a relatively small proportion of the light which falls thereon.

The present invention relates to a new process for determing the spectral composition of diffused radiation. This process, which may be carried out in a very simple manner, is based on an optical zero method, which makes it very accurate.

It is an object of the present invention to measure the spectral composition of radiation diffused by a colored opaque surface, which process is essentially characterized by the fact that a light beam is formed and preferably filtered by suitable means to render it monochromatic or substantially monochromatic. An incident beam thus created is then separated into two distinct beams, one of which is to be measured and which is directed against the colored surface to be analyzed, and a reference beam which is directed against a reference surface. The light beams diffused by the reference surface and the surface to be analyzed are then recombined and projected onto the cathode of a photomultiplier tube so as to produce a voltage proportional to the luminus flux received by said cathode, which is modulated at a suitable frequency by means of shutters, which block the beam to be measured on the one hand and the reference beam on the other hand, in such a manner that the beam to be measured is totally blocked when the reference beam is not blocked at all, and vice versa. A curve representing the variations in the output voltage of the photomultiplier tube as a function of time is formed on the screen of a cathode ray oscilloscope, and the light of the reference beam is varied by means of an optical attenuator, the position of adjustment of which gives a quantity which makes it possible to identify the coefficient of diffusion of the analyzed surface for the wave length of the monochromatic light being used.

In a preferred method of carrying out the invention, the incident monochromatic light beam is divided into a measuring beam and a reference beam by directing the incident beam against a semi-reflective mirror, to which both the beam to be measured and the reference beam are returned, after having been diffused by the surface to be analyzed and the reference surface, so that the semi-reflective mirror can be used both to divide the incident beam and to recombine the two divisions of that beam and direct them to the photomultiplier tube.

In a first embodiment of the invention a light source other than a point source is used so as to create a homogenous luminous flux which is isolated by suitable diaphragm means.

In a second embodiment of the invention one part of the filament of an electric lamp is used as the light source and its image is projected directly onto the cathode of the photomultiplier tube.

It is in this case particularly advantageous, when a semi-reflective mirror is used to divide the incident beam, to bring about asymmetry between the path of the measuring beam and that of the reference beam by placing in the path of one of said beams a number of mirrors different from the number of mirrors in the path of the other beam. This arrangement makes it possible to exactly superpose on the photocathode the two images of the filament of the incandescent lamp which are transmitted by the measuring beam and the reference beam respectively.

When this method is used and the two images of the filament are superposed on the photocathode, the luminous flux from the filament may in practice be merged into the total luminous flux, so as to avoid the necessity of accurately determining the true angles of the different fluxes.

In a preferred method of carrying out the invention, the reference beam is attenuated by interposing in its path a glass plate having a progressively varying opacity. In particular, it is advantageous to use a disk, the opacity of which varies from point to point around its circumference, so that the beam may be attenuated by rotating the disk.

According to the invention it may also be desirable that the measuring beam and the reference beam strike the surface to be analyzed and the reference surface at a slight angle of the order of 5° (five degrees) with respect to a perpendicular to the surface, instead of at right angles, particularly when the diffusing surfaces are protected by a glass plate. This is in order to avoid, insofar as possible, extraneous reflections which could impair the accuracy of the measurement.

In like manner, the attenuator may, if desired, be slightly inclined with respect to the plane normal to the axis of the ray.

In accordance with another characteristic of the invention, the shutter may be so controlled that at all times the angular sum of the unblocked portions of the width of the measuring beam and the reference beam is constant and equal to the angular width of each of these two beams when unblocked.

Another object of the present invention is to provide a new article of manufacture which comprises a device adapted to carry out the aforesaid process, said apparatus being essentially characterized by the fact that it comprises in combination: a light source which directs a preferably monochromatic incident light beam onto a semi-reflective mirror, preferably positioned at an angle of 45° with respect to the axis of said incident beam, means for supporting the surface which is to be analyzed, means for supporting a reference surface, these latter two means being so positioned that at least part of the light beams which impinge on said surfaces is reflected back to the semi-reflective mirror, an optical device such as an objective which projects the ray recombined by the semi-reflective mirror to the cathode of a photomultiplier tube the output of which is transmitted to the screen of a cathode ray oscilloscope, attenuating means which preferably comprises a glass plate having areas which differ in opacity, and finally a shutter which makes it possible to modulate the measuring and reference beams so that when either is completely blocked the other is not, the two beams being preferably blocked in such a way that the angular sum of their unblocked widths remains constant.

In a specific embodiment of the invention, the shutter consists of a cylindrical surface pierced by a certain number of orifices distributed about its periphery. These orifices are rectangular in development and separated from each other by an interval having a length equal to that of an orifice. This cylindrical shutter is rotated at a suitable speed, for example, of the order of 100 to 1000 r.p.m., depending upon the number of orifices therein.

Such a shutter may comprise, for example, six openings separated by six solid sections, turning at a speed of about 300 r.p.m.

In this embodiment the semi-reflective mirror may advantageously be positioned at the axis of the shutter, so that the measuring light beam and the reference light beam are directed at right angles to each other, and thereafter recombined after having been diffused by the reference surface and the surface to be analyzed.

In order that the invention may be better understood, one embodiment thereof will now be described, purely by way of illustration, and without suggesting that the scope of the invention is limited to the structural details thereof.

This embodiment will be described with reference to the accompanying drawings, on which:

FIGS. 1 and 2 schematically represent two ways of carrying out the process according to the invention;

FIG. 3 is a schematic perspective view showing the different elements of an apparatus for carrying out the invention;

FIG. 4 is an elevational view of an apparatus for carrying out the invention;

FIG. 5 is a partial section taken along the line V—V of FIG. 4, but on a larger scale;

FIG. 6 is a sectional view taken partially in elevation and partially in section along the line VI—VI of FIG. 5; and FIGS. 7 and 8 represent curves displayed on a cathodic oscilloscope, with the attenuator in use in FIG. 8 but not in use in FIG. 7.

FIG. 1, which diagrammatically represents one method of carrying out the process according to the invention, shows the lamp 1 which constitutes a light source larger than a point, and which transmits an incident beam through the objective 2 to the monochromatic filter 3.

The incident beam falls on the semi-reflective mirror 4 which reflects one part of the beam toward the colored surface 5 which is to be analyzed and the other part toward the reference surface 6. One part of the light diffused by both the surface to be analyzed 5 and by the reference surface 6 returns to the semi-reflective mirror to be directed by the objective 7 onto the cathode 8 of a photomultiplier tube, not shown.

An attenuator 9 is positioned in the path of the reference beam which travels from the semi-reflective mirror 4 to the reference surface 6. This attenuator consists of a glass disk having parallel faces, the opacity of which disk varies around its periphery. By turning the attenuator 9 around its axis 10, the fraction of the light beam diffused by the reference surface 6 and which returns to the semi-reflective mirror 4 may be varied at will.

The rotating shutter 11, which is provided with orifices 12 in its cylindrical surface, is shown schematically. These orifices are separated by solid portions 13 of equal length.

The construction of the device is such that the incident beam travelling from the lamp 1 to the semi-reflecting mirror 4, as well as the final beam travelling from the semi-reflective mirror 4 to the cathode of the brightness amplifier 8, are not both blocked at any one time by the shutter 11.

The measuring beam on the other hand, which travels from the semi-reflecting mirror 4 to the surface 5 which is to be analyzed, and the reference beam, which travels from the semi-reflecting mirror 4 to the reference surface 6, travel along paths cut by the orifices 12 and solid portions 13 of the rotating shutter 11.

In the particular embodiment illustrated, the shutter is provided with six openings, each of which makes it possible to completely block the measuring beam while passing the entire reference beam and vice versa, since the two beams in question are at an angle of 90° to each other and the semi-reflecting mirror 4 is positioned at the axis of the shutter.

Under these conditions, when the attenuator 9 has been placed in a regulating position which corresponds to a predetermined absorption of the luminous flux of the reference beam, the cathode 8 of the photomultiplier tube will receive the same energy (and produce the same electrical voltage) when the rotating screen is in a position in which it completely blocks the reference beam and passes all the measuring beam, as when in another position it completely blocks the measuring beam and permits all the reference beam to pass through.

It follows that, when observing on the screen of the cathode ray oscilloscope, the changes in the voltage of the photomultiplier tube, successions of traces will be seen which are positioned alternately at two different levels, to the extent that the attenuator has not been adjusted. By suitably adjusting the attenuator, it is possible to bring the two traces to substantially the same level, thus creating a single substantially straight line.

In this position it may be said that the monochromatic light diffused by the surface to be analyzed corresponds to that diffused by the reference surface, allowing for the correction introduced by the attenuator.

In other words, the position of adjustment of the attenuator gives the ratio between the coefficient of diffusion of the surface to be analyzed and that of the reference surface, which may, for example, be an absolute white.

The method of FIG. 2 differs from the one which has just been described only in that a mirror 14 has been inserted in the path of the reference beam.

In this way it is possible to superpose on the cathode 8 of the photomultiplier tube the projection of the two images of the filament of the lamp 1, one of these images having been transmitted by the measuring beam.

In the case of the method of FIG. 1, on the other hand, the two images formed by the measuring and reference beams are symmetrical about a line and cannot be directly superimposed.

The arrangement shown on FIG. 2 has the advantage that the image of one part of the filament of the lamp 1 may be used to form the different light beams which are necessary to carry out the process. It is therefore unnecessary to exactly position different diaphragms defining the contours of the said beams.

FIG. 3 shows schematically the different elements and the paths of the light beams in an embodiment of the invention which will hereinafter be described in greater detail.

FIG. 3 shows the lamp 1 with its objective 2, the filter 3, the semi-reflecting mirror 4, the surface to be analyzed 5, the reference surface 6, the objective 7 and the photomultiplier tube 8, together with the attenuator 9 positioned in the path of the reference beam.

A mirror 14 is also placed in the path of the incident beam so that the device which generates this beam may be vertically positioned. Moreover, the mirrors 15 and 16 have eliminated the rotating shutter 11 from the path of the beam travelling from the lamp 1 to the semi-reflecting mirror 4, as well as the recombined beam travelling from the semi-reflecting mirror 4 to the photomultiplier tube 8.

FIG. 3 also clearly shows how the shutter 11 acts on the measuring and reference beams.

FIG. 4 is an elevational view showing an embodiment of the invention including a lamp 1, its objective 2, and the mirror 14 which reflects the incident beam into the measuring apparatus. FIG. 4 also shows the attenuator 9, its control knob 10, and the pointer 17 which is fixed to the attenuator and permits its position to be measured relative to a fixed scale 18.

Finally, FIG. 4 shows the motor 19 which drives the rotating shutter, the support 20 for the reference surface, and the objective 7 which concentrates the recombined beam on the cathode of the photomultiplier tube 8.

FIGS. 5 and 6 show in section on a larger scale the apparatus shown in elevation on FIG. 4. FIG. 6 shows how the motor 19 is fastened by a clamp 21 in its cradle 22, which is itself attached by two bolts 23 to the base of the apparatus.

The housing of the motor 19 carries a cylindrical casing 25 within which the shutter 11 is rotatably mounted, being fixed to the shaft 26 of the motor 19. The front of the box 25 is closed by a cover 27 which carries the optical assembly of the apparatus. The center of the cover 27 supports the semi-reflecting mirror 4 (the angular position of which may be adjusted by means of the knurled nut 28), as well as the mirrors 15 and 16 (see FIG. 3).

In order to simplify the drawing, FIG. 5 shows only the shaft 29 for the mirror 15 and the shaft 30 which carries the mirror 16.

On FIG. 6 the mirror 16 is shown in section, while the mirror 15 is not visible.

Each of the two mirrors 15 and 16 is mounted on an arcuate bracket 31 provided with a threaded adjusting rod 32 which screws into a tapped hole in the cover 27, the rod 32 being locked in position by a knurled nut 33.

The mirror 16 is held in its support 34 between a threaded base plate 35 and a rubber ring 36. FIG. 5 clearly shows the shields 37 and 38, provided with holes 39 and 40 which, like the holes 41 and 42 in the cover 27, permit the various light beams to pass through.

As may be seen on FIGS. 5 and 6, the semi-reflecting mirror 4 is fastened to its mounting by means of a threaded ring 44.

The cylindrical casing 25 supports a block 45 which carries the supports for the reference surface and the surface to be analyzed and on which the attenuator 9 is pivotally mounted.

As may be seen on FIG. 5, the reference surface 6 is held in its cylindrical support 20 between a glass plate 46 and a base plate 47 which screws into the support 20.

The support 20 may be easily manipulated by means of the knurled knob 48 carried by the base plate. The knob 48 also makes it possible to detach the support so as to change the reference surface 6.

The support 20 frictionally and smoothly engages in a bore 49 in the block 45.

A hole 50 through the block 45 and casing 25 permits the reference beam to travel from the semi-reflecting mirror 4 to the reference surface 6 and back again.

The attenuator 9 is fixed to a rotating member 51 which turns smoothly on the fixed shaft 52 screwed at 53 into the block 45.

A knurled knob 10 screwed onto the member 51 makes it possible to adjust the attenuator 9, while the spring 54 creates sufficient friction to retain the attenuator 9 in the position to which it has been moved by the knurled knob 10.

The upper part of the block 45 is also provided with a bore 55 which receives the support for the surface to be analyzed, which surface is mounted in the same way as the reference surface 6. The bore 55 communicates with the inside of the casing through an orifice 56.

FIG. 6 shows the filter 3 in broken lines. This filter may be removed toward the rear in a direction perpendicular to the plane of the figure.

The objective 7 and the photomultiplier tube 8 are of a known type and have therefore not been described in detail. The photomultiplier tube is supplied from a stabilized voltage source and its output signals are transmitted to a cathode ray oscilloscope of a conventional type, only the screen of which has been shown in FIGS. 7 and 8, to show the curves characteristic of the process according to the invention. Similarly, the electric lines supplying the motor 19 and the lamp 1 have not been shown on the drawings.

The apparatus which has just been described works in the following manner:

The different components of the apparatus are adjusted until the images of the light source are projected onto the cathode of the photomultiplier tube.

The support for the colored surface to be analyzed is mounted in the bore 55 in the top of the apparatus and the support 20 for the reference surface 6 is mounted in the bore 49. The reference surface may be an absolute white.

The lamp 1 is turned on, and a filter 3, which corresponds to the wavelength to be measured, is placed in position.

The various electrical components are turned on and the motor 19 which drives the screen is started up.

After suitable adjustment of the sweep of the oscilloscope, an image like that shown on FIG. 7 is seen. This image, which is that of an approximately square wave, comprises upper horizontal segments 57 interspersed between lower horizontal segments 58.

Each segment corresponds to a period in which one of the two beams (measuring beam and reference beam) reaches the cathode of the photomultiplier tube. The vertical spacing between these segments results from the fact that the two beams are not identical.

By varying the position of the attenuator 9, the separation between the segments can be regulated and the attenuator is so adjusted as to bring the segments to the same level, as shown in FIG. 8.

The position of the pointer 17 on the scale 18 then indicates, for the wavelength in question, the percentage of light which is not diffused by the surface to be analyzed, but is diffused by the reference surface when exposed to identical lighting conditions.

It will of course be seen that the apparatus according to the invention permits the use of different filters in analyzing the color spectrum of a surface.

The process and apparatus according to the invention have the advantage of affording great accuracy, of the order of one part in a thousand, when the characteristics of the surface to be measured are very close to those of the reference surface.

Moreover, the illuminating characteristics of the light source are not of primary importance, since at each instant a single incident beam is used, which is divided into a measuring beam and a reference beam.

It follows that it is unnecessary to provide a stabilized voltage generator to supply the light source, so that one of the disadvantages of most known apparatuses of this type is eliminated.

It will of course be appreciated that I have described one specific embodiment of my invention purely by way of example and that the structural details thereof may be modified without thereby departing from the basic principles of the invention.

In particular, it is clear that the colored surfaces can be slightly inclined with respect to the axial ray of the light beam so as to reduce, if desired, parasitic reflections on the sheets of glass which protect the surfaces.

It follows that the surfaces of these sheets of glass may also be treated by known method to limit parasitic reflections.

Moreover, it is possible to utilize in carrying out the invention an optical attenuator other than the circular attenuator which has been described and, for the reasons hereinbefore pointed out, to incline said attenuator relative to the axial ray of the beam.

Finally, it will be noted that the reference surface and the surface to be analyzed serve similar purposes, the identification as the reference surface having been in the present description for the one of these surfaces which has the greatest diffusing power, since the attenuator is normally placed in the path of the beam which strikes the surface having the greatest diffusing power.

However, it is obvious that, if desired, the adjustable attenuator could be placed in the path of the measuring ray if a surface which diffused less light were used as the reference surface, or if a fixed attenuator having predetermined characteristics were placed in front of the reference surface.

What is claimed is:

1. A method for measuring the radiation reflected by an opaque surface which method comprises the steps of rendering monochromatic an incident light beam emanating from an exposed portion of the filament of an incandescent lamp, dividing said incident beam into a measuring beam directed onto and reflected from a specimen surface to be analyzed and a reference beam directed onto and reflected from a reference surface, redirecting said measuring and reference beams along a common path after their reflection by said specimen and reference surfaces respectively, projecting said redirected beams towards the cathode of a photoelectric tube while alternately interrupting said beams so as to progressively block out an increasing portion of the image carried by one of said beams and simultaneously pass an equal portion of the image carried by the other beam, and reversing the image cast by one of said beams, so as to form on said cathode from the individual images carried by said beams a single complete image of said filament, forming a trace representative of the voltage changes in said cathode on the screen of an oscilloscope, and attenuating the full width of said reference beam until said trace indicates a substantially constant voltage.

2. Apparatus for measuring the spectral composition of radiation reflected by an opaque surface comprising in combination a light source for producing an incident beam, a semi-reflective mirror dividing said incident beam into a reference beam and a measuring beam, a reference support in the path of the reference beam and a specimen support in the path of the measuring beam, said supports being positioned to cause the reference and measuring beams to be respectively reflected by a reference and specimen carried by said supports back to said semi-reflective surface, at which they are redirected along a common path, a photocell having a cathode positioned to receive said redirected beams, means in said common path for forming on said photocell an image of said light source, means for alternately interrupting the reference or measuring beam in such manner as to progressively block out an increasing portion of the image carried by one of said beams and simultaneously pass an equal portion of the image carried by the other beam, one more mirror positioned in the path of one of said reference and measuring beams then in the path of the other to reverse the image carried by said one beam relative to that carried by the other beam, an oscilloscope connected to said photocell to exhibit a trace representative of changes in the voltage of the photocell, and an attenuator for regulating the intensity of the measuring beam throughout its width until the trace on the oscilloscope indicates a zero voltage.

3. Apparatus as claimed in claim 2 in which said light source is the filament of an incandescent lamp positioned behind a fixed opening.

References Cited

UNITED STATES PATENTS

| 2,434,029 | 1/1948 | Williams. | |
| 2,832,257 | 4/1958 | Hunter. | |
| 3,041,924 | 7/1962 | Strass | 350—314 |
| 3,340,764 | 9/1967 | Bergson. | |
| 2,605,671 | 8/1952 | Canada | 250—204 |

FOREIGN PATENTS

| 789,409 | 1/1958 | Great Britain. |
| 873,671 | 3/1942 | France. |
| 921,743 | 3/1963 | Great Britian. |

RONALD L. WIBERT, Primary Examiner

V. P. McGRAW, Assistant Examiner

U.S. Cl. X.R.

356—93, 179